United States Patent [19]

Gudel

[11] 4,096,634
[45] Jun. 27, 1978

[54] METHOD AND DEVICE FOR THE MEASUREMENT OF ANGLES ON SPACE PLANES

[76] Inventor: Alfred Gudel, Gaswerkstrasse 26, 4900 Langenthal, Switzerland

[21] Appl. No.: 706,740

[22] Filed: Jul. 19, 1976

[30] Foreign Application Priority Data

Jul. 22, 1975 Switzerland .......................... 9595/75
Jan. 31, 1976 Switzerland ........................... 352/76

[51] Int. Cl.² .............................................. G01B 3/56
[52] U.S. Cl. ...................................... 33/75 C; 33/112; 33/174 M
[58] Field of Search ................. 33/75 R, 75 C, 174 M, 33/112

[56] References Cited

U.S. PATENT DOCUMENTS

| | | | |
|---|---|---|---|
| 1,104,518 | 7/1914 | Leslie et al. | 33/172 R |
| 1,345,597 | 7/1920 | Jantsch et al. | 33/172 R |
| 3,250,011 | 5/1966 | Telfurd | 33/112 X |
| 3,273,252 | 9/1966 | Bunge | 33/112 |
| 3,380,165 | 4/1968 | Urban | 33/75 R |
| 3,479,744 | 11/1969 | Howland et al. | 33/172 R |
| 3,688,412 | 9/1972 | Keener | 33/174 M |

FOREIGN PATENT DOCUMENTS

| | | | |
|---|---|---|---|
| 1,185,601 | 2/1959 | France | 33/112 |
| 603,608 | 10/1934 | Germany | 33/174 M |
| 39,881 | 8/1957 | Poland | 33/174 M |

*Primary Examiner*—Harry N. Haroian
*Attorney, Agent, or Firm*—James E. Nilles

[57] ABSTRACT

A method for the angle measurement of space planes (i.e. plane surfaces) in particular for angle measurement of two straight lines (or more), given by at least two points of the space plane, and a device for applying the method.

8 Claims, 8 Drawing Figures

METHOD AND DEVICE FOR THE MEASUREMENT OF ANGLES ON SPACE PLANES

SUMMARY OF THE INVENTION

The purpose of the invention is to create a method and a device for angle measurement which enables a simple, sure and exact measurement and also permit a simple calibration of the device. In the method of this present invention, a first straight line is taken as a reference line, and an auxiliary straight line is placed parallel to the reference line, which intersects the second straight line at one point. With the distance difference of two determination points of the second straight line with respect to the auxiliary straight line, and with the distance of the distance points on the auxiliary straight line, the angle between the second straight line and the auxiliary straight line, or the reference straight line, is determine with the formula $$tg = (d_3 - d_4)/a$$

The device has an angle element with two legs having a specific angle ratio to one another; the reference leg has been provided with contact devices for contact with at least two points of a space plane, fashioned in such a way that they cause an equal distance of the leg from the contact points when they are placed upon the plane; the measuring leg has been provided with contact elements for placement at at least two additional points of the plane, which determine two distances between the measuring leg and one contact plane, such distances lying in one plane together with a longitudinal axis of the measuring leg, the axis being located parallel to or in the center plane of the reference leg; at least one of the contact elements at the measuring leg is fashioned in such a way that the distance of its contact point with respect to the measuring leg is variable; the second contact element can be measurably displaced along the measuring leg by means of a contact point slide.

After the procedure, the device is calibrated, according to the invention, in the following manner: A body is used whose one cross section contour forms a closed line; its angles deviate from a median angle only so far that the tangent of the angle of deflection can be replaced by the circular measure of the angle. The adjustable contact devices are at first adjusted in such a way that their adjustment corresponds to a differential angle — small by the same criteria — as a deviation from the median angle. All angles are then measured and the deviations of the adjustments of the movable contact element with respect to the initial setting are added up. The sum of the deviations is divided by the number of angles and used as the correction value for the initial setting of the movable contact devices.

DESCRIPTION OF A PREFERRED EMBODIMENT

Figure 1:
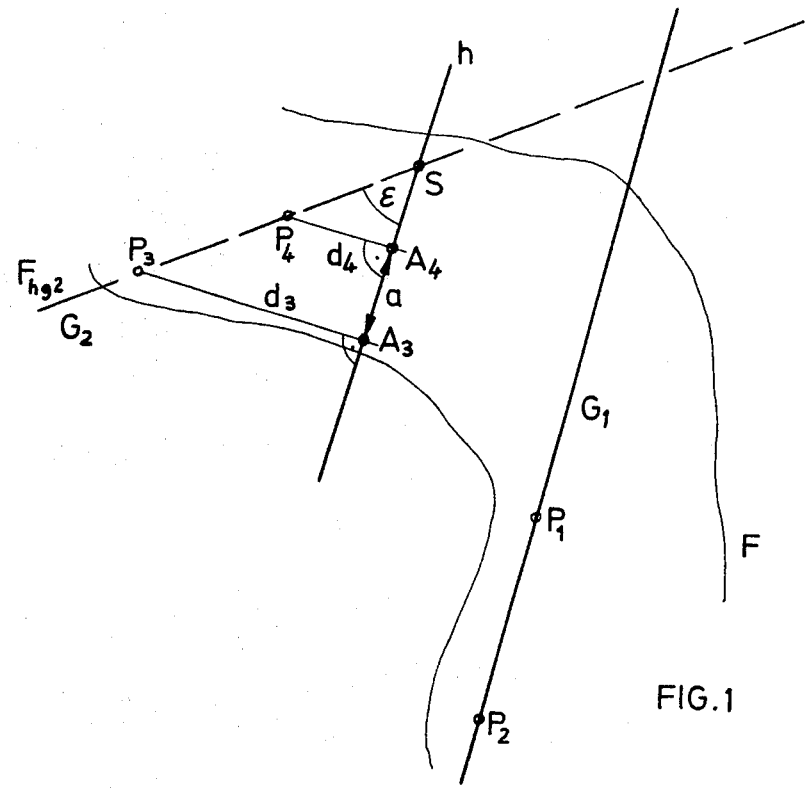
FIG. 1 is a basic drawing explaining the method for measuring the angles of two warped lines.

In FIG. 1, the points $P_1$ and $P_2$ are two plane points of a space plane F, which determine a first straight line $G_1$; in the extreme case, this straight line $G_1$ has in common with the space plane F only the two points $P_1$ and $P_2$. By means of another pair of points $P_3$ and $P_4$ of the space plane F a second straight line is determined, which in the extreme case likewise has only the said pair of points in common with the space plane F. In the normal case, as shown in FIG. 1, the two lines $G_1$ and $G_2$ are warped. An auxiliary straight line $h$ is now placed parallel to the straight line $G_1$ so that it intersects the line $G_2$ at point S; thus, the plane $F_{hg2}$, defined by the auxiliary line $h$ and the straight line $G_2$, runs parallel to the first straight line $G_1$. If the distances $d_3$ and $d_4$ from the auxiliary straight line $h$ to the point pair $P_3$ and $P_4$ are now measured and the distance $a$ of the two distance points A3 and A4 on the auxiliary straight line is determined, the angle $\epsilon$ between the straight line $G_2$ and the auxiliary straight line $h$, or the straight line $G_1$, can be determined with the formula $$tg\epsilon = (d_3 - d_4)/a$$

Figure 2:
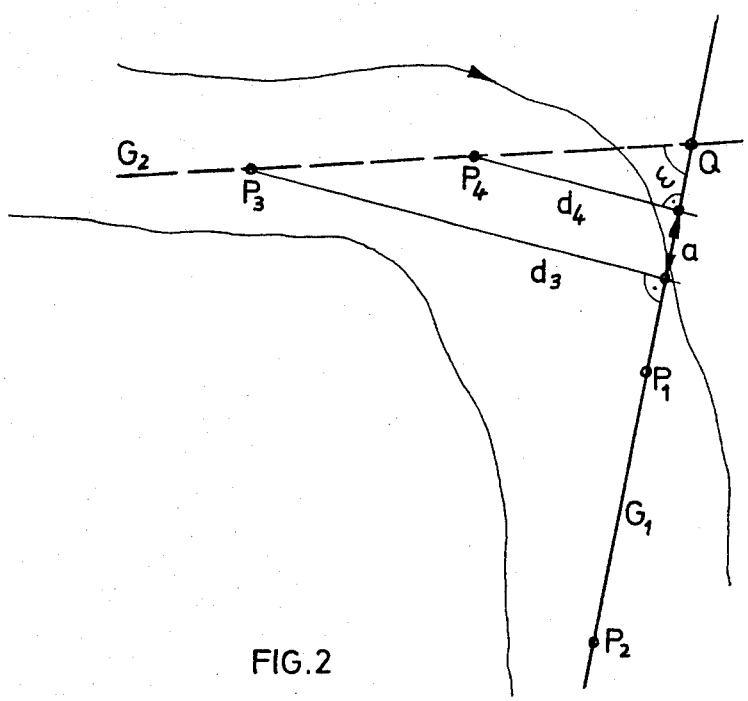
FIG. 2 is a basic drawing to explain the method for measuring the angles of two intersecting straight lines.

FIG. 2 shows a special case, in which the angle of two straight lines $G_1$ and $G_2$ is measured. The straight lines, determined again by the point pairs $P_1$ and $P_2$, or $P_3$ and $P_4$, are not warped, but intersect at point Q. Here, the auxiliary straight line $h$ is, according to the above-mentioned conditions, the straight line $G_1$ itself. The calculation of the angle between the straight line $G_1$ and $G_2$ is made as explained in connection with FIG. 1.

Figure 3:
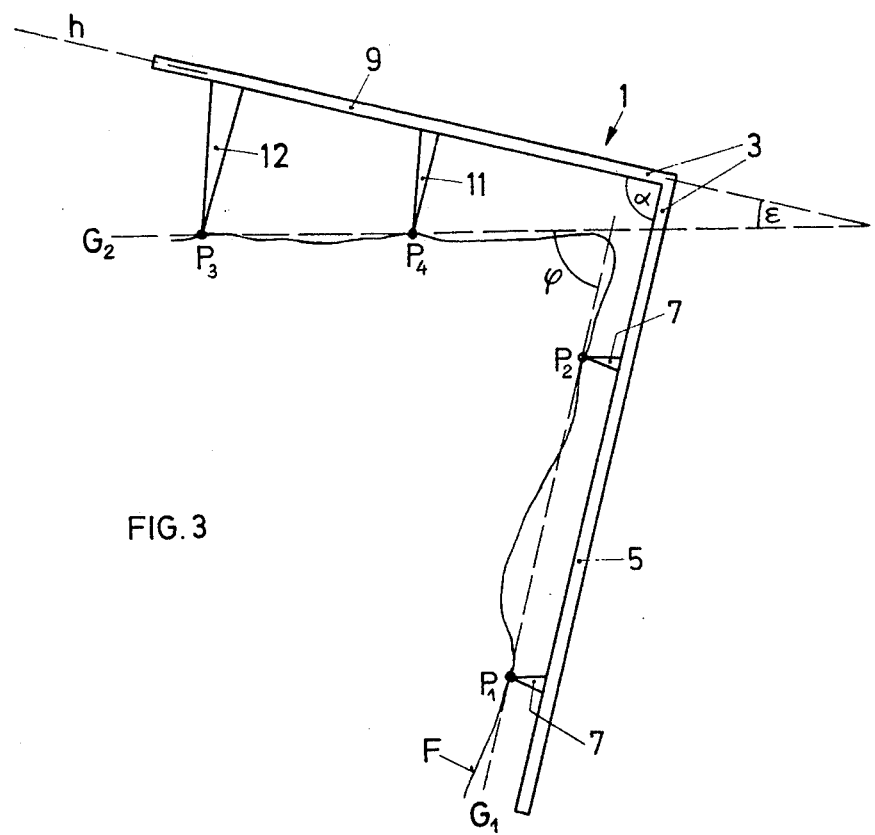
FIG. 3 is a diagram of a device for applying the method to two intersecting straight lines.

FIG. 3 shows the basic construction of a device for applying the afore-described measuring method for intersecting straight lines. The first straight line $G_1$ is placed through two points P1 and P2 of the space plane F, the second straight line $G_2$ runs through two plane points P3 and P4. Since, in the normal case, both straight lines $G_1$ and $G_2$ penetrate the space plane F in different ways, the measuring device 1 has an angle element 3, whose one leg 5, being the reference leg, is supported on the two plane points P1 and P2 with contact elements of equal length, thus, it runs parallel to the straight line $G_1$ placed through points P1 and P2. This consequently shows that the two contact elements 7 have contact points for the space plane which are equidistant from the reference leg 5. The auxiliary straight line $h$ is represented by a second leg 9, the measuring leg, which, with reference to the reference leg 5 includes a certain angle $\alpha$. The measuring leg has two contact elements 11 and 12, which are placed on the two points P3 and P4 and determine a straight line $G_2$. Obviously, at least one of the two contact elements 11, 12 must be variable with respect to that one of its elements which stands off the measuring leg 9.

It may be advantageous to make the two contact elements 11 and 12 movable along the measuring leg 9, in order to place them at the desired points. The angle between the measuring leg 9 and the straight line $G_2$ can be determined from the height difference of the contact elements 11, 12, and from their distance on the measuring leg 9. Depending on whether the contact element 11, which is located closer to the reference leg 5, is longer or shorter at contact than the contact element 12, which is located farther away from the reference leg 5, the length difference of the two contact elements 11, 12 will have a positive or negative sign. Accordingly, the angle between the measuring leg 9 and the straight line $G_2$ will be positive or negative at the formation of the tangent. The angle $\varphi$ between the two straight lines $G_1$ and $G_2$ can be determined from the difference of the angle $\alpha$ between the two legs 9 and 5 and the angle $\epsilon$ between the leg 9 and the straight line $G_2$.

In FIG. 3 the space plane F is shown as a convexly bent plane. Concavely bent space planes, or rather the angles between straight lines on such space planes, can also be determined with such a device. The device according to FIG. 3 is then modified so that the contact elements 7, 11 and 12 are pointed to the outside, instead of the inside, with respect to the angle element 3.

Figure 4:
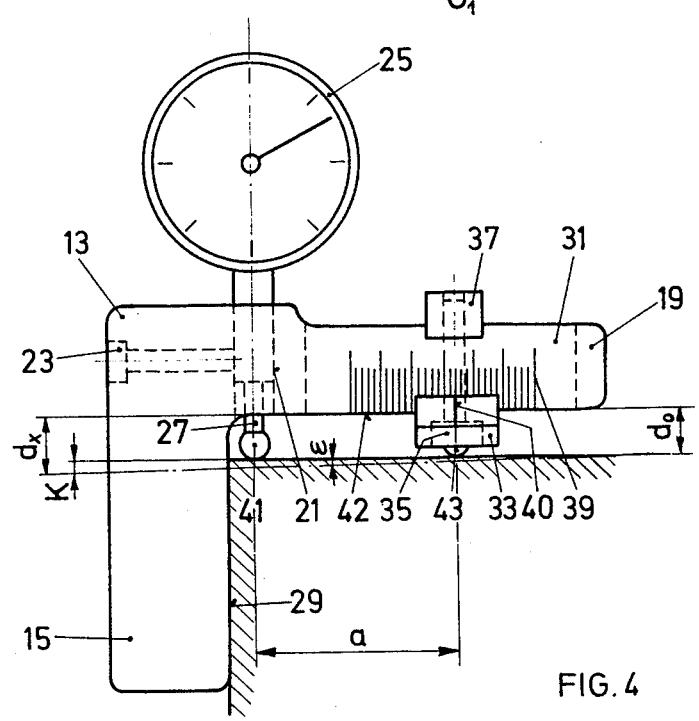
FIG. 4 is a side view of a device for measuring the angles of two intersecting straight lines on two planes.

FIG. 4 shows a device for the measurement of the angle of intersecting straight lines in a space plane; such a device is particularly suited for measuring the angle between two intersecting planes. Basically, the transition from measuring two intersecting straight lines to measuring an angle between two planes is achieved by placing the contact elements at the legs of the angle elements not merely on two points, but on at least three points in each case, i.e. on one each plane. These are the two planes whose mutual angle of inclination is to be measured.

By placing both legs area-wise on the respective planes it can be assured that the angle between two gravitating straight lines is measured in each of the planes. These gravitating straight lines include the mutual angle of the two planes. According to FIG. 4 the measuring device has an angle element 13 with a reference leg 15 and a measuring leg 19. Normally, the two legs 15 and 19 include a right angle: The conjuncture of the measuring leg 19 and the reference leg 15 has, on the measuring leg 19, a bore hole 21 parallel to the reference leg 15, in which the neck of a dial gage 25 is fastened by means of a lock screw 23. This dial gage 25 has a movable measuring feeler 27, which extends to the outside through the neck of the dial gage 25 and the bore hole 21. The feeler's height, or position, is indicated by a dial of the gage 25 proportional to length, as is customary in commercial depth gages. Further, the measuring leg 19 has a continuous longitudinal (31) slot running vertically to a plane support area 29 of the reference leg 15. On the side of the measuring leg 19 which faces the inside angle of the angle element 13 is a contact point slide 33, which can be moved along the measuring leg 19. This slide can be locked by means of a lock screw 35, which extends through the slot 31 and has contact with a counterpiece 37 at the upper side of the leg. A metric (39) scale is etched into the lateral surface of the measuring leg 19, so that the distance from the slide's two contact points with reference to the contact point of the measuring feeler 27 of the dial gage 25 can be determined by means of a mark 40 on the slide 33. The contact element of the measuring feeler 27 is a ball 41. The contact elements of the slide 33 are two balls 43, mounted parallel to the plane 29.

The dial gage can now be calibrated, for instance with a movable number scale as used in commercial depth gages, in such a way that the dial points at zero when the ball 41 protrudes from the measuring leg 19 exactly the same distance as the contact balls 43 are from the measuring leg's base area. In that case, if the device is placed against a plane with the surface 29 of the reference leg 15, the balls 43 and 41 rest on a second plane. When the dial of the gage 25 is at zero, the second plane is exactly vertical to the first. If the angle between the two planes is not 90°, the ball 41 will extend more or less from the measuring leg 19. As a result of the above-mentioned calibration, the dial scale then shows the difference between the distances of the contact balls 43 and the contact ball 41 from the base area 42. With this reading, and the reading of of the distance of the measuring feeler axis of the measuring feeler 27 from the straight lines through the centers of the two contact balls 43, it is now possible to calculate the angle to be measured, which is included in the two planes, or rather its deviation from 90°. It is self-evident that it is easily possible to graduate the scale of the dial gage in such a way that an angle error, or the deviation of the angle included in two planes — to be measured — with respect to any calibrated angle, can be read.

By using the outer surface of the reference leg 15 as the contact surface and re-mounting the contact point slide 33, the counterpiece 37 and the measuring gage 25, 27, 41, so that the contact point balls 43 and 41 extend to the outside with respect to the angle element 13, it is possible to check the inside angle of two adjoining planes with the same method and the same device.

If the scale of the dial gage 25 is scaled in proportion to length with respect to the extension distance of the measuring feeler 27, a simple calibrating method results. For the 90° calibration, for example, a body is used which, among others, is formed by four surfaces which stand nearly vertically on one another. The dial gage is set in such a way that the dial is approx. at zero when the angle of two adjoining planes is measured. Now let $d_o$ be the distance of the contact balls 43 from the base area 42 of the lower measuring leg 19;

$d_x$ be the measure of the extension of the contact ball 41 beyond this area at an angle (near an angle);

$a$ be the distance of the straight line through the contact balls 43 and the contact ball 41, and K be a still unknown deviation of the zero point of the scale from the dial position at exactly 90°.

The value indicated by the dial of the gage 25 for an angle $\epsilon_x$ between that one of the planes to be measured above which the measuring leg 19 lies, and the measuring leg 19 itself, is expressed by the following:

$$tg\epsilon_x = \frac{(d_x + K) - d_o}{a} = \frac{d_x - d_o}{a} + \frac{K}{a}$$

Since it was assumed that the angles at the calibrating body shall deviate little from 90°, the angle $\epsilon$ will become small, so that we can say with sufficient exactness:

$$\epsilon_x \approx \frac{d_x - d_o}{a} = \frac{K}{a}$$
($\epsilon_x$ : in the circular measure)

If all four angles are measured, their sum becomes $$\sum_{x=1}^{4} \epsilon_x = \underbrace{\frac{\sum_{x=1}^{4}(d_x - d_o)}{a}}_{II} + \underbrace{\frac{4K}{a}}_{I}$$

Since the term I represents the term of error and term II the sum of the nominal value, it becomes clear that, regardless of the individual values of the four angles, or the terms of the sum, the sum of the four angles is 360°, and that the term II must equal zero when the scale indicates zero at an angle of 90°. It follows that $$\sum_{x=1}^{4} \epsilon_x = \frac{4K}{a}$$

The linear error adjustment is determined from the sum of the measuring values read on the dial gage 25 by dividing the sum of the readings by four and correcting the scale zero point by the value thus received. This is possible because, according to $$a \cdot \sum_{x=1}^{4} \epsilon_x = 4K$$

the distance of the contact points 43 and contact point 41, multiplied by the sum of the error angles, corresponds to four times the linear error adjustment.

For the zero point calibration of a 60° angle a triangle is used, for the calibration of 120° a hexagon. If the gage scale is angle scaled, the process is simplified and also becomes more accurate.

it is possible with the above-described measuring device to check angles on work pieces very exactly; the contact points, contrary to traditional angle measuring methods, are defined and a deviation from the nominal value can be measured quantitatively.

To apply the general method, the device according to FIG. 4 must be modified in such a way that the base area 42 of the measuring leg 19 is positioned vertical to the center plane of the angle element 13, for instance movable along an axis and pivotable around the intersection straight line of the planes 29 and 42. Further, the reference 15 leg must be equipped with, for example, two contact balls, and the 19 measuring leg must only have two contact balls 43, so that both legs can be placed along warped lines. Of course, the dial gage may be replaced with other measuring devices, e.g. depth gages with direct indication on the measuring feeler.

The following design of the device for the measurement of angles on space planes represents a refinement of the device as per the invention. In that sense, the device according to the invention is characterized by the fact that it is designed as inside or outside angle meter.

It is described below with the help of the design drawings shown in FIGS. 5 to 7.

Figure 5:
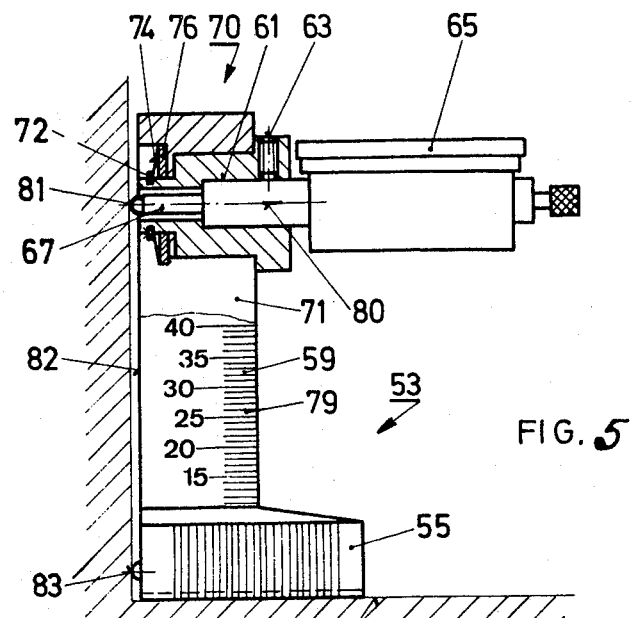
FIG. 5 is a side view of a device for measuring interior angles.
Figure 6:
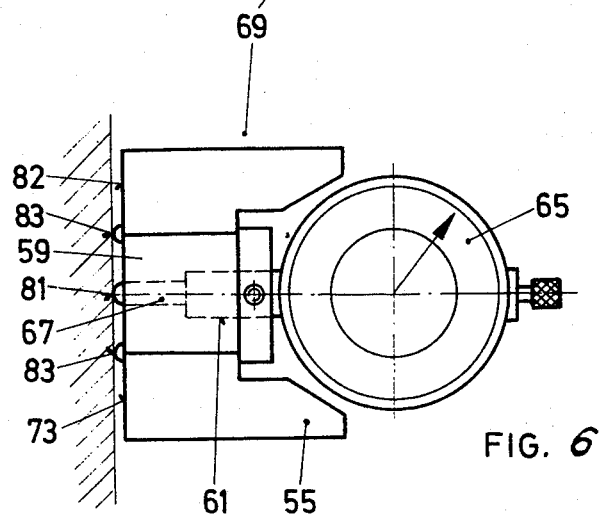
FIG. 6 is a top view of the device according to FIG. 5.

FIGS. 5 and 6 show a measuring device with an angle element 53 and a reference leg 55, as well as a measuring leg 59. The two legs 55 and 59 normally stand at a right angle to one another. In the free end of the measuring leg 59 there is, parallel to the reference leg 55, a continuous bore hole 61, in which the neck of a dial or feeler gage 65 is fastened with a locking screw 63. This dial gage 65 has a movable measuring feeler 67, which extends to the outside through the neck of the dial gage 65 and the bore hole 61. The height, or position, of the feeler is indicated in longitudinal proportion by a dial of the dial gage 65, as is customary in commercial depth gages. Further, the measuring leg 59 has a continuous longitudinal slot 71 vertical to a plane support surface 69 of the reference leg 55. The dial gage is supported by a slide 70, which is spring-mounted in the measuring leg 59 and movable in the longitudinal slot 71. Etched into the lateral surface of the measuring leg 59 is a metric scale 79, so that the distance between the contact point 81 of the measuring feeler 67 of the dial gage 69 and the two contact points 83 can be determined by means of a mark 80 located on the slide 70. The contact element of the measuring feeler 67 is a ball 81. The contact elements on the surface 73 of the reference leg 55 at the slide 33, such surface 73 being vertical to the surface 73, are two balls 83, placed, for example, parallel to the plane 69.

The dial gage 65 can now be calibrated, for instance with a movable number scale as used in commercial depth gages, in such a way that the dial points at zero when the ball 81 protrudes from the measuring leg 59 exactly the same distance as the contact balls 83 are from the base area 82 of the measuring leg. In that case, if the device is placed against a plane with the surface 69 of the reference leg 55, the balls 83 and 81 rest on a second plane. When the dial of the gage 65 is at zero, the second plane is exactly vertical to the first. If the angle between the two planes is not 90°, the ball 81 will extend more or less from the measuring leg 59. As a result of the above-mentioned calibration, the dial scale then shows the difference between the distances of the contact balls 83 and the contact ball 81 from the base area 82. With this reading, and the reading of the distance of the measuring feeler axis of the measuring feeler 67 from the straight lines through the centers of the two contact balls 83, it is now possible to calculate the angle to be measured, which is included in the two planes, or rather its deviation from 90°. It is self-evident that it's easily possible to graduate the scale of the dial gage in such a way that an angle error, or the deviation of the angle included in two planes, to be measured, in relation to any calibrated angle, can be read.

Figure 7:
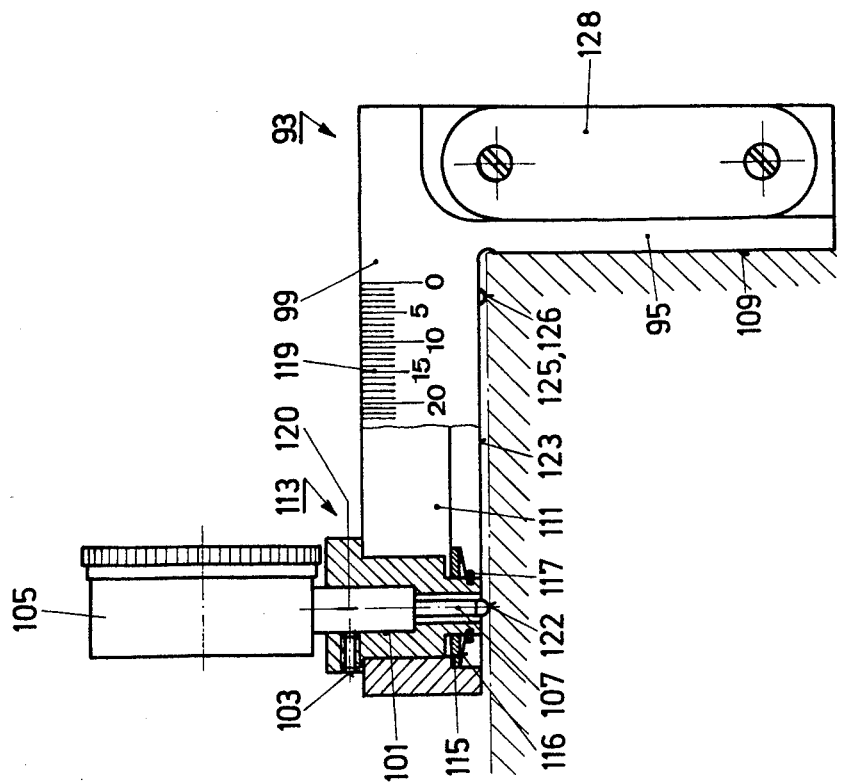
FIG. 7 is a device analogous to FIG. 5 for the measurement of exterior angles, with adjustable measuring element.
Figure 8:
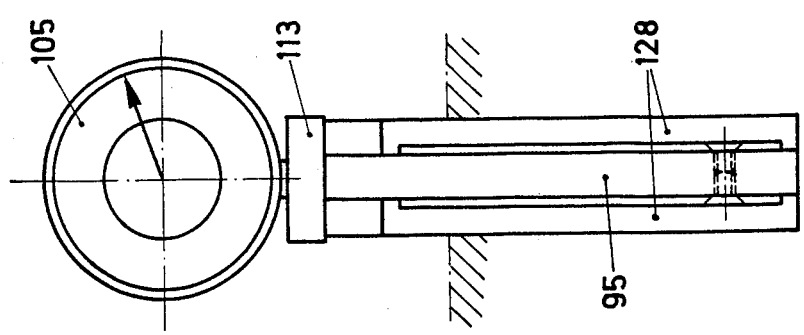
FIG. 8 is a side view of the device according to FIG. 7.

A further design for the measuring of outside angles is shown in FIGS. 7 and 8. Basically, this instrument functions in the same manner as the device described in connection with FIG. 4: From the point of view of measuring technology, the difference lies in the fact that in these designs with movable dial gage there is less danger of errors as a result of inaccurate placement of the device.

This measuring instrument, too, has an angle element 93 with a reference leg 95 and a measuring leg 99. In a bore hole 101 is the shaft of a dial gage 105, which is held in place by means of a locking screw 103. A measuring feeler 107 extends through the measuring leg 93 as shown in FIG. 7. The reference leg 95 is located on one of the contact surfaces 109 of the angle to be measured.

In the measuring leg 99 is a longitudinal slot 111, which makes it possible to displace the measuring leg 99 longitudinally by means of a slide 113, in which the dial gage 105 is mounted. The spring-loaded connection between the slide 113 and the measuring leg 99 is established by means of a spacer ring 115 and a spring 116, for example a cup or coil spring, and by a snap ring 117. The measuring leg 99 has an etched scale 119, and the slide has an indicated mark 120. A ball is located in the free end of the measuring feeler (122, 107). The measuring leg 99 has a base surface 123, from which protrude two balls 125 and 126, which should be preferably located parallel to the contact surface 109. These balls 125 and 126 are mounted fixed or rollable in the measuring leg 99.

The reference leg 95 has a casing 128, which should preferably consist of acid-resistant and heat-isolating material. This casing 128 is held when handling the instrument. Furthermore, this design, too, has the above-mentioned characteristics, including the possibility of calibration.

I claim:

1. A device for angle measurement of space planes, including: an angle element with two legs rigidly connected to each other and having a specific angle ratio to one another, said legs having longitudinal axes which intersect at a right angle; a planar contact device formed by a plane surface of one of said two legs which is a reference leg for contact with at least two contact points of a space plane located at said reference leg, said planar contact device extending in parallel to said reference leg's longitudinal axes; first and second contact elements mounted on the other of said two legs which is a measuring leg for contact with at least two additional points of said space plane, whereby said contact elements determine at least two distance lines between said measuring leg and respective contact points, said distance lines extending in parallel to the longitudinal axes of said reference leg; means for adjustably supporting at least the first of said contact elements on said measuring leg so that the distance of the respective contact point is variable with respect to the measuring leg, said measuring leg having a longitudinal slot; said first contact element being mounted via slide means in said measuring leg so that it can be measurably moved along said measuring leg, said slide means being spring mounted in said slot to fix it movably in said slot, said first contact element being mounted on the measuring leg at a greater distance from said reference leg than said second contact element, said second contact element on said measuring leg comprising a pair of contact elements for contacting said space plane at least at two spaced apart contact points, said two contact points defining a line which extends normally with respect to the plane defined by said two legs, at least said said first contact element comprising means for automatic adjustment of the length thereof under contact pressure, a measuring device connected to said first contact element in order to measure the distance between the respective contact point of said first contact element and said measuring leg, a measuring scale on said measuring leg between said two contact elements in order to determine the distance between said two contact elements.

2. A device according to claim 1 wherein said second contact element includes two balls, located rollably in in said measuring leg.

3. A device according to claim 1 wherein said measuring device comprises a dial gauge with a movable feeler carrying said first contact element.

4. A device according to claim 1 wherein said dial gauge includes a circular scale and an indicator, the displacement of said feeler being transmitted to effect movement of said indicator in such a way that said indicator executes circular movement proportional to said displacement.

5. A device according to claim 1 wherein said measuring device has a scale for reading the angle between the plane of said contact device and at least one straight line determined by said contact elements.

6. A device according to claim 1 wherein said measuring scale is a metric scale.

7. A device according to claim 1 wherein said contact elements and contact device are on the outer sides of the respective legs, with respect to the angle enclosed therebetween.

8. A device according to claim 1 wherein said reference leg has hand-grip casings.

* * * * *